W. SPARKS.
BEARING FOR SHAFTS.
APPLICATION FILED AUG. 14, 1916.
1,239,057.
Patented Sept. 4, 1917.
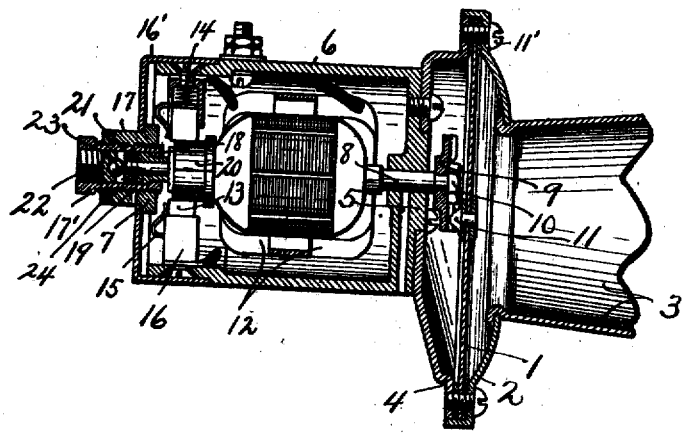
WITNESSES:
INVENTOR
William Sparks
BY Howard P. Denison
ATTORNEY

UNITED STATES PATENT OFFICE.

WILLIAM SPARKS, OF JACKSON, MICHIGAN, ASSIGNOR TO THE SPARKS-WITHINGTON COMPANY, A CORPORATION OF OHIO.

BEARING FOR SHAFTS.

1,239,057. Specification of Letters Patent. Patented Sept. 4, 1917.

Original application filed October 8, 1915, Serial No. 54,735. Divided and this application filed August 14, 1916. Serial No. 114,845.

*To all whom it may concern:*

Be it known that I, WILLIAM SPARKS, a citizen of the United States, and resident of Jackson, in the county of Jackson, in the State of Michigan, have invented new and useful Improvements in Bearings for Shafts, of which the following, taken in connection with the accompanying drawings, is a full, clear, and exact description.

This invention relates to certain improvements in bearings for shafts and the like, and the subject-matter hereof is disclosed in my co-pending application Serial No. 54,735, of which this application is a division.

The primary object of the invention is to provide a combined end-thrust and tension bearing adapted for positively moving the shaft endwise in both directions.

Other advantages and analogous uses will appear from the following description, taken in connection with the accompanying drawings, in which:

The figure discloses the invention as utilized in a horn or warning signal to which it is peculiarly adapted.

In order that the invention and a use of the same may be clearly understood, I have disclosed the bearing in connection with a diaphragm horn comprising a vibratory diaphragm —1— having its marginal edge clamped between the base —2— of an amplifier —3— and a ring —4— having a circular opening eccentrically disposed with respect to the diaphragm —1— for the reception of a boss —5— formed upon the end of a cup-shaped motor casing —6— having its rear end partially closed by a transverse bar —7— carrying a bearing for an armature shaft —8— having its opposite end journaled in the end wall of the case —6— and projecting into the chamber formed between the diaphragm —1— and ring —4—, and a suitable toothed actuator —9— is secured upon this end of the motor shaft in any suitable way, as by nut —10—, the teeth of which actuator are adapted to contact with a wear-piece or projection —11— upon the diaphragm for forcing vibration of the latter as the toothed actuator is rotated.

The case —6— may be secured to the ring —4— in any suitable way, as by screws —11'—, and carries suitable pole pieces and field coils, indicated at —12—. The commutator brushes —13—, the springs —14—, the conductors —15— and the guides or boxes —16— are similar to those shown in my co-pending application Serial No. 861,220.

The rear open end of the case —6— is adapted to be closed by a cap —16'— having a central opening for receiving an internally threaded boss —17— formed upon the cross bar —7—. The internally threaded boss —17— is substantially axially disposed with respect to the case —6— and is adapted to adjustably receive an externally threaded sleeve —17'—.

The inner end of the sleeve —17'— is provided with a stepped portion —18— of less diameter than the internal diameter of the sleeve to form an internally projecting circumferential shoulder for coöperative engagement with a stepped member —19— mounted upon the end of the armature shaft near the commutator —20— and held in place by a suitable locking nut —21—.

The rear portion of the sleeve —17'— is internally threaded for the reception of a set screw —22— having a seat for receiving a rotary ball —23—, which ball in adjusted position of the set screw —22— bears against the end of the motor shaft —8— and forms an end-thrust bearing therefor.

It will be readily apparent that the set screw —22— may be adjusted to account for variance in the length of the motor shaft and variance in the size of the other portions of the bearing to prevent longitudinal movement of the shaft —8— in either direction, and that the sleeve —17'— may be adjusted through the bar —7— to adjust the armature shaft and bearing longitudinally in both directions to vary the overlap of the cam surfaces or teeth of the actuator —10— on the wear-piece —11— and such sleeve may be locked in any desired position of adjustment by a lock nut —24—.

Although I have shown and described one particular construction and method of operation and adjustment of the parts, I do not desire to limit myself to the same, as changes may be made in the details of construction and operation without departing from the spirit of this invention as set forth in the appended claims.

What I claim is:

1. In a bearing for shafts, a member having an internally threaded boss, an externally threaded sleeve adjustably engaged with the internally threaded boss, means for locking the sleeve in adjusted position relatively to the boss, said sleeve provided with a radially and inwardly extending shoulder, a shaft having an end positioned within the sleeve and provided with a radially and outwardly extending shoulder of greater diameter than and adapted to engage the shoulder on the sleeve, an end-thrust member having a threaded relation with the sleeve and provided with a rotary ball bearing against the end of the shaft and adapted to hold the shoulder on the shaft in substantial contact with the shoulder on the sleeve whereby the shaft is caused to move positively in either longitudinal direction in accordance with the movement of the sleeve relatively to the boss.

2. In a bearing for shafts, a member having an internally threaded boss, an externally threaded sleeve adjustably engaged with the internally threaded boss, said sleeve provided with a radially and inwardly extending shoulder, a shaft having an end positioned within the sleeve and provided with a radially and outwardly extending shoulder of greater diameter than and adapted to engage the shoulder on the sleeve, an end-thrust member having a threaded relation with the sleeve and adapted to hold the shoulder on the shaft in substantial contact with the shoulder on the sleeve whereby the shaft is caused to move positively in either longitudinal direction in accordance with the movement of the sleeve relatively to the boss.

In witness whereof I have hereunto set my hand this August, 1916

WILLIAM SPARKS.

Witnesses:
LILLIAN WUNDERLICH,
W. J. CORBETT.